United States Patent
Robbins et al.

(10) Patent No.: US 10,687,178 B2
(45) Date of Patent: Jun. 16, 2020

(54) PHONE-LESS MEMBER OF GROUP COMMUNICATION CONSTELLATIONS

(71) Applicant: Orion Labs, San Francisco, CA (US)

(72) Inventors: Jesse Robbins, San Francisco, CA (US); Ellen Juhlin, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

(21) Appl. No.: 15/910,772

(22) Filed: Mar. 2, 2018

(65) Prior Publication Data
US 2018/0255437 A1   Sep. 6, 2018

Related U.S. Application Data

(60) Provisional application No. 62/466,754, filed on Mar. 3, 2017.

(51) Int. Cl.
*H04W 4/08* (2009.01)
*H04W 8/24* (2009.01)
(Continued)

(52) U.S. Cl.
CPC ............ *H04W 4/08* (2013.01); *G06F 40/205* (2020.01); *G10L 15/1822* (2013.01);
(Continued)

(58) Field of Classification Search
CPC . G06F 3/167; G06F 17/2705; G10L 15/1822; G10L 2015/223;
(Continued)

(56) References Cited

U.S. PATENT DOCUMENTS

| 6,757,531 B1 | 6/2004 | Haaramo |
| 7,251,495 B2 | 7/2007 | Keyani |

(Continued)

FOREIGN PATENT DOCUMENTS

| CA | 2891067 A1 | * | 6/2014 | ............ H04W 4/06 |
| CA | 2891067 C | * | 8/2017 | ............ H04W 4/06 |

(Continued)

OTHER PUBLICATIONS

Del Rey, Amazon plans to release new Alexa devices that can make phone calls and work as intercoms, Mar. 3, 2017, Vox Media, Recode, https://www.vox.com/2017/3/3/14766486/new-amazon-alexa-echo-phone-calls-intercom-system-video (accessed Feb. 2, 2020) (Year: 2017).*

*Primary Examiner* — Eric Nowlin (57) ABSTRACT

Systems and methods are described for intelligent grouping between group communication devices. In some embodiments, a method includes receiving, at a remote management platform, a recorded audio message from a first communication device that device includes a cellular networking component capable of connecting the first communication device to a cellular network. The first communication device may have a default grouping with a set of additional communication devices. In some embodiments, the default grouping can be created at a factory when the communication devices are manufactured. In other embodiments, the first communication device and the set of additional communications devices can be automatically paired upon initialization via a local communication network. A linking request can be automatically sent to the remote management platform to create the default grouping (e.g., by creating an entry in a routing table at the remote management platform).

19 Claims, 8 Drawing Sheets

(51) Int. Cl.
*G10L 15/18* (2013.01)
*G06F 40/205* (2020.01)
*G10L 15/22* (2006.01)
*H04W 8/18* (2009.01)

(52) U.S. Cl.
CPC ......... *H04W 8/24* (2013.01); *G10L 2015/223* (2013.01); *H04W 8/183* (2013.01)

(58) Field of Classification Search
CPC . H04M 2203/2044; H04W 4/08; H04W 4/10; H04W 4/12; H04W 8/24
See application file for complete search history.

(56) References Cited

U.S. PATENT DOCUMENTS

| | | | | |
|---|---|---|---|---|
| 9,374,682 | B2 * | 6/2016 | Weng | H04W 4/06 |
| 9,730,023 | B2 * | 8/2017 | Swirsky | H04W 4/027 |
| 9,992,642 | B1 * | 6/2018 | Rapp | H04W 4/14 |
| 10,321,166 | B2 * | 6/2019 | Albrecht | G06F 3/165 |
| 2004/0014456 | A1 | 1/2004 | Vaananem | |
| 2005/0105712 | A1 | 5/2005 | Williams | |
| 2005/0159144 | A1 * | 7/2005 | Hager | H04M 3/5322 455/416 |
| 2008/0268960 | A1 * | 10/2008 | Farrier | A63F 13/12 463/42 |
| 2010/0112964 | A1 * | 5/2010 | Yi | G04G 9/0064 455/90.3 |
| 2010/0260247 | A1 * | 10/2010 | Albiston | H04B 3/548 375/222 |
| 2012/0221639 | A1 * | 8/2012 | Mallet | G06Q 50/01 709/204 |
| 2014/0148209 | A1 * | 5/2014 | Weng | H04W 4/06 455/518 |
| 2015/0071426 | A1 * | 3/2015 | Weiner | H04L 51/04 379/204.01 |
| 2015/0302856 | A1 * | 10/2015 | Kim | G10L 17/22 704/273 |
| 2017/0105190 | A1 * | 4/2017 | Logan | H04W 68/00 |
| 2017/0213452 | A1 * | 7/2017 | Brunolli | G08C 17/02 |
| 2017/0250935 | A1 * | 8/2017 | Rosenberg | H04L 51/16 |
| 2017/0250936 | A1 * | 8/2017 | Rosenberg | H04L 51/18 |
| 2017/0279906 | A1 * | 9/2017 | Laird-McConnell | H04L 67/22 |
| 2017/0289070 | A1 * | 10/2017 | Plumb | H04L 51/02 |
| 2017/0353742 | A1 * | 12/2017 | Albrecht | G06F 3/165 |
| 2018/0116004 | A1 * | 4/2018 | Britt | H04W 40/125 |
| 2018/0182389 | A1 * | 6/2018 | Devaraj | G10L 15/22 |
| 2018/0231954 | A1 * | 8/2018 | Booker | G05B 19/409 |
| 2018/0278718 | A1 * | 9/2018 | Brown | H04W 4/08 |
| 2018/0288104 | A1 * | 10/2018 | Padilla | H04L 65/1069 |
| 2019/0068526 | A1 * | 2/2019 | Xie | H04L 67/303 |
| 2019/0371312 | A1 * | 12/2019 | Naughton | G10L 15/22 |
| 2019/0371313 | A1 * | 12/2019 | Naughton | H04M 3/4936 |
| 2019/0371314 | A1 * | 12/2019 | Naughton | G06F 3/167 |
| 2019/0377605 | A1 * | 12/2019 | Joseph | G06F 9/5011 |
| 2019/0377898 | A1 * | 12/2019 | Dunjic | H04L 65/1083 |
| 2019/0378505 | A1 * | 12/2019 | Wang | G10L 15/22 |
| 2019/0378519 | A1 * | 12/2019 | Dunjic | G06F 21/32 |

FOREIGN PATENT DOCUMENTS

| | | | | | |
|---|---|---|---|---|---|
| CN | 103856386 | A | * | 6/2014 | ............ H04W 4/06 |
| CN | 103856386 | B | * | 10/2016 | ............ H04W 4/06 |
| CN | 106488025 | A | * | 3/2017 | |
| CN | 107566250 | A | * | 1/2018 | |
| CN | 105681704 | B | * | 10/2018 | |
| EP | 1937025 | A2 | * | 6/2008 | ......... H04L 12/1818 |
| EP | 1937025 | A3 | * | 4/2016 | ......... H04L 12/1818 |
| JP | 5967684 | B2 | * | 8/2016 | ............ H04W 4/06 |
| KR | 20150074206 | A | * | 7/2015 | ............ H04W 4/06 |
| KR | 101584085 | B1 | * | 1/2016 | ............ H04W 4/06 |
| WO | WO-2014082458 | A1 | * | 6/2014 | ............ H04W 4/06 |
| WO | WO-2018175200 | A1 | * | 9/2018 | ............ H04L 67/10 |

* cited by examiner

PHONE-LESS MEMBER OF GROUP COMMUNICATION CONSTELLATIONS

CROSS-REFERENCE TO RELATED APPLICATIONS

This application claims priority to U.S. Provisional Application Ser. No. 62/466,754 filed Mar. 3, 2017, which is incorporated herein by reference in its entirety for all purposes.

BACKGROUND

Modern communications devices have become an essential part of the lives of individuals around the world. These devices allow people to communicate in a variety of ways for both business and personal reasons. Examples of modern communication devices include cellular telephones, smartphones, discrete devices, computers, tablets, and others. Many of these devices often require multi-step processes to send and/or receive the communications. For example, some communication devices require a user to perform multiple steps with a graphical user interface that may not be practical or even possible for a user to perform in some settings. As such, in some cases, users may prefer communication devices for communicating with one another with less complicated interfaces for sending and receiving communications.

SUMMARY

Systems and methods are described for intelligent grouping between group communication devices. More specifically, some embodiments relate to grouping phone-less members of group communication constellations. In some embodiments, a method includes receiving, at a remote management platform, a recorded audio message from a first communication device that device includes a cellular networking component capable of connecting the first communication device to a cellular network. The first communication device may have a default grouping with a set of additional communication devices. In some embodiments, the default grouping can be created at a factory when the communication devices are manufactured. In other embodiments, the first communication device and the set of additional communications devices can be automatically paired upon initialization via a local communication network. A linking request can be automatically sent to the remote management platform to create the default grouping (e.g., by creating an entry in a routing table at the remote management platform).

Once a recorded message is received, the remote management platform can identify the set of additional communication devices associated with the default grouping and transmit the recorded message to that specific set of additional communication devices.

In some embodiments, the default group can be modified upon request (e.g., via a graphical user interface or voice command) by creating or editing entries within a routing table within the remote management platform. As a result, any recorded audio message received after the entry is added or modified will be routed to the default grouping and the additional communication device. In some embodiments, the additional communication devices can be a bot capable of processing natural language commands and generating a response (e.g., placing an order, collecting information, searching the web, etc.).

Some embodiments include a method for generating a registration request upon initial activation of the communication device. The communication device can be authorized to be used on a cellular network which can be used to transmit an activation signal from the communication device to a cloud-based management platform running on one or more servers. The cloud-based management platform automatically associates, upon activation and based on a factory setting, the communication device with a group of additional communication devices identified by a factory setting. An audio message can be recorded at the group communication device that is then transmitted via the cellular network to the cloud-based management platform. The cloud-based management platform can then identify the group of additional communication devices and automatically transmit the recorded audio message to each of the additional communications devices (e.g., one or more bots, voice assistants, or IoT devices).

Embodiments of the present invention also include computer-readable storage media containing sets of instructions to cause one or more processors to perform the methods, variations of the methods, and other operations described herein.

Some embodiments provide for a remote management platform that includes a processor, a database, a pairing module, a group management module, a natural language processor, a message conversion module, and/or an identification module. The database can store multiple group profiles that include communication profiles identifying communication devices within a group of communication devices associated with that profile. The pairing module configured to receive a grouping request generated upon an initial activation of a communication device and create an entry within a routing table. The entry can be based, at least in part, on information within the grouping request associating multiple communication devices together so that recorded audio messages received from any one of the multiple communication devices are automatically routed to the remaining communication devices according to the entry within the routing table. The group management module configured to receive a modification request from one of the multiple communication devices and update the entry in the routing table to include an additional communication device or to remove at least one of the communication devices from the group.

The natural language processor can be used to analyze the recorded audio message. For example, the natural language process can search and identify various types of directives (e.g., implicit directives, explicit directives, etc.) within recorded messages. The message conversion module can, generate a modified message based, at least in part, on the directive identified by the natural language processor. The routing module can route the message to a destination (e.g., endpoints such as the other group communication devices). The identification module can receive responses from the bot and identify the group for routing. The routing module can then route the responses from the bot to the group identified by the identification module.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for intelligent grouping between group communication devices. More specifically, some embodiments relate to phone-less members of group communication constellations. In accordance with various embodiments, group communication devices may need to be grouped together so that multiple users can easily communicate with each other. Forming these groups may be difficult and time-consuming for large numbers of devices. Also, as situations change groups may need to also change to accommodate different group configurations, add various bots, Internet of Things (IoT) devices, voice assistants, or other group members.

Some embodiments provide for communication devices that are set at the factory with an initial group setting. This grouping creates a link (e.g., within a table stored on a remote management platform) between the devices that allows any of the communication devices to communicate with the other devices in the group. For example, multiple devices (e.g., two, three, four, or more) may be added to a group and then sold to a consumer as a set. As such, the users of this set of communication devices do not have to take the time to add these devices to a group and can begin communications immediately upon purchase. In some embodiments, these communication devices include personal communication nodes that include discrete devices specialized for group communications that include one or more wireless transceivers and user interface elements tailored to streamlined group communications.

The group communications can be initiated and/or altered either by user intervention or automatically by a shared remote management system. In some embodiments, the features of the discrete devices can be incorporated into other devices, such as personal communication devices which comprise cellular smartphones, gaming devices, wearable devices, personal computers, tablet computers, and the like. Voice command features can be included that allow user to modify the group, perform keyword-based searching, access productivity assistance, or access navigation assistance, among other features. Further features can include conversational interaction for information transmittal or retrieval, such as activity reminders, weather, stocks, messaging, email, calendar, contacts, notes, music, clocks, web browsers, maps and other applications.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to personal communication devices by creating default communication settings for groups of devices, embodiments of the present technology are equally applicable to various other cloud-based electronic devices.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
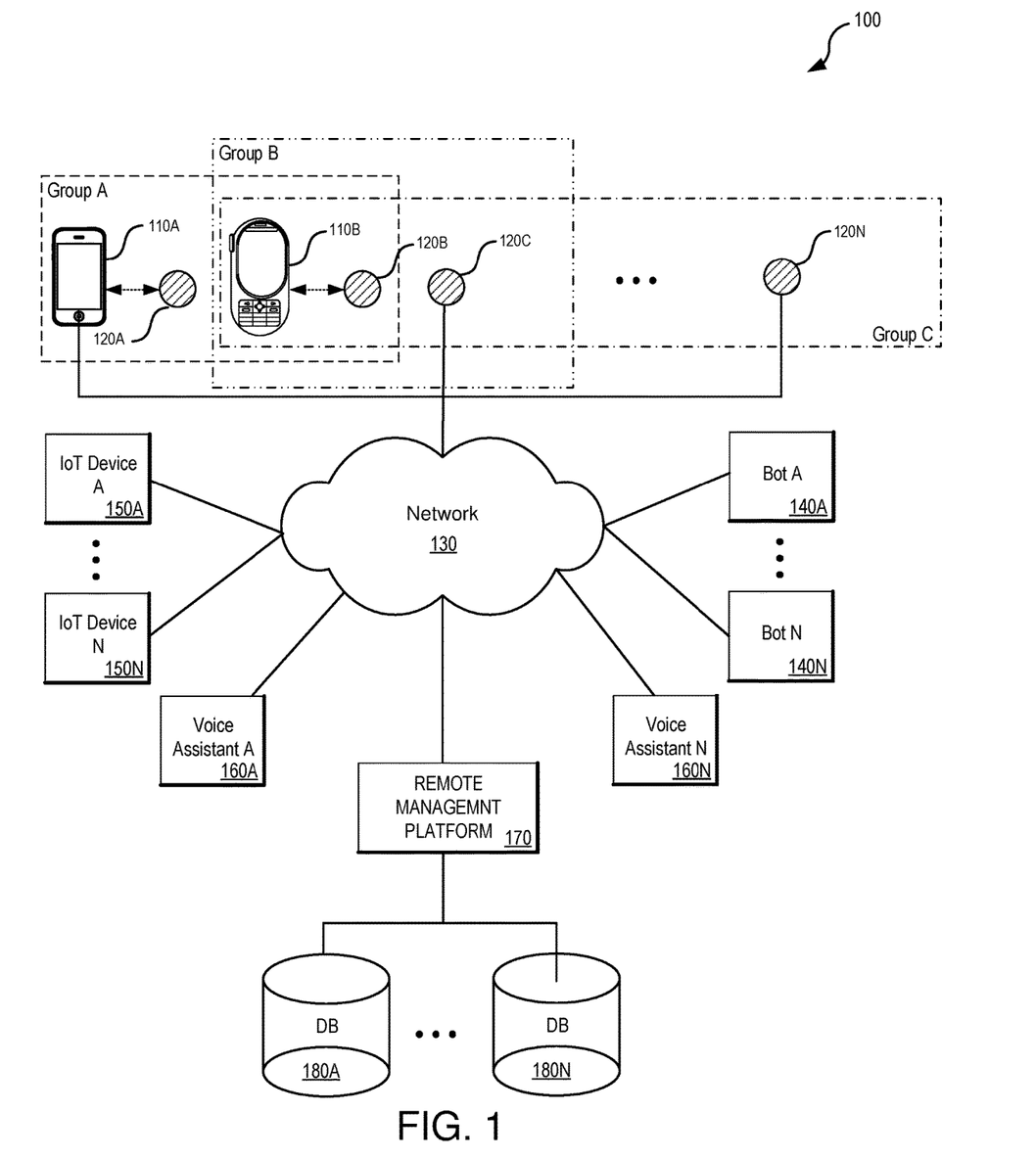
FIG. 1 illustrates an example of a communications environment in which various embodiments of the present technology may be used.

FIG. 1 illustrates an example of a communications environment 100 in which various embodiments of the present technology may be used. As illustrated in FIG. 1, communications environment 100 may include one or more intermediary devices 110A-110B (e.g., a mobile device, mobile phone, tablet computer, mobile media device, mobile gaming device, vehicle-based computer, wearable computing device, etc.) which can connect to one or more group communication devices 120A-120N, communications network 130, bots 140A-140N, IoT devices 150A-150N, voice assistants 160A-160N, remote management platform 170, and databases 180A-180N. In addition, intermediary devices 110A-110N and/or group communication devices 120A-120N can include various network communication components that enable intermediary devices 110A-110N and/or group communication devices 120A-120N to communicate with other devices, bots 140A-140N, IoT devices 150A-150N, voice assistants 160A-160N, remote management platform 170 or other devices or systems by transmitting and receiving wireless signals using licensed, semi-licensed or unlicensed spectrum over communications network 130.

In some cases, communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Examples of communications network 130 include, but are not limited to, Long Term Evolution (LTE), Global System For Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), and the like.

In accordance with some embodiments, group communication devices 120A-120C may be sold in groups (e.g., two, three, four, or more devices). These devices can establish a default grouping for communicating with recorded messages (e.g., audio messages, video messages, etc.) thereby preventing the user from having to create the group manually. This grouping may be done at the factory or upon activation. For example, when one of group communication devices 120A-120N is first activated by a user (e.g., over-the-air, in a retail store, via an application running on intermediary device 110A-110B, scanning a code, etc.), one or more registration messages can be generated which can be transmitted through communications network 130 to remote management platform 170. The registration messages may include device identifier, user identifier, and/or other information which can be used to register the device, identify a group, create a group, or for other purposes.

In some embodiments, each of the group devices sold together may share a common portion of a device identifier which can be used by remote management platform 170 to add the device to the common group for communications. The following table illustrates an example of the group communication device ID being used to create an entry in a routing table within databases 180A-180N that can be accessed by remote management platform 170. The entry may also include various device profile information such as device configurations or capabilities, model numbers, attributes, and the like.

| GCD ID | Group # | Attributes | Device Configuration |
|---|---|---|---|
| ABCD12-A1234 | 1 | Location A | LTE-Enabled |
| ABCD12-A3456 | 1 | Location B | LTE-Enabled |
| ABCD12-B345 | 1 | Location C | Bluetooth Only |

-continued

| GCD ID | Group # | Attributes | Device Configuration |
|---|---|---|---|
| IURD14-BCD12 | 2 | Noise Level 1 | Bluetooth Only |
| IURD14-ACD12 | 2 | Noise Level 2 | LTE-Enabled |

Once the group has been formed, a user can record a message via one of the group communication devices 120A-120N. The recording may be limited (e.g., less than two minutes) or continue until the user signals (e.g., by a pause in speaking, physical interaction with the group communication device, or other signaling) that the recording should end. The group communication devices or intermediary devices 110A-110B can then transmit a signal that includes the recorded message to remote management platform 170 where decisions can be made about how to route the recorded message. For example, remote management platform 170 can identify additional members in a group (e.g., by looking up a routing entry in databases 180A-180N). Some embodiments use a dynamic routing table which can include additional information (e.g., IP addresses) that can be updated as the device moves around. Once the additional members of the group have been identified, the recorded message can be sent to the other members in the group.

As illustrated in FIG. 1, a device may belong to multiple groups. For example, group communication devices 120A and 120B may be part of group A, while group communication devices 120B and 120C may be part of Group B. As a result, a user may have to select (e.g., via voice commands, hardware manipulation, etc.) which group the user intends the recorded message to be used for communication. In addition, any of the groups may include additional endpoints other than group communication devices 120A-120N. For example, a group may also include bots 140A-140N, IoT devices 150A-150N, voice assistants 160A-160N, and the like. Remote management platform can process the recorded messages originating from group communication devices 120A-120N to identify various directives. The directives can include implicit directives, explicit directives, or bot directives.

For example, a personal message can include an implicit bot directive. When remote management platform 170 detects a directive, the message can be routed accordingly to an endpoint other than group communication devices 120A-120N that are within the group. For example, a message recorded at group communication device may state the following: "Barabara, would you like to go see Star Wars tonight at the movie theater?" Remote management platform 170 can identify that this message includes an implicit bot directive to retrieve the start times for Star Wars. The original message can be delivered to Barabara's communication device followed by a response from a bot identifying movie times.

Bots 140A-140N may facilitate keyword-based searching, productivity assistance, or navigation assistance, among other features. In some embodiments, bots 140A-140N may facilitate conversational interaction for information transmittal or retrieval, such as activity reminders, weather, stocks, messaging, email, calendar, contacts, notes, music, clocks, web browsers, maps and other applications. Similarly, IoT devices can be any smart device (e.g., smart home appliance, security system, etc.) that can be commanded or accessed remotely.

Various components illustrate in FIG. 1 may use secure communication methods for communicating with other components of the system. Secure communication methods include where users and nodes can securely share communications and other information among each other without non-group member or third-party interception or monitoring of the information or associated communications. Secure communication methods may comprise symmetric key encryption, asymmetric key encryption, public-key encryption, or some other type of encryption, including combinations thereof. The actual communications between personal communication devices can employ secure communication methods, and the associated links can employ secure communication methods independently.

End to end encryption of communications, such as audio communications, can be established among members of the group. These end-to-end encrypted communications can include transport layer security (TLS) or secure sockets layer (SSL) communications, among other secure link types.

Figure 2:
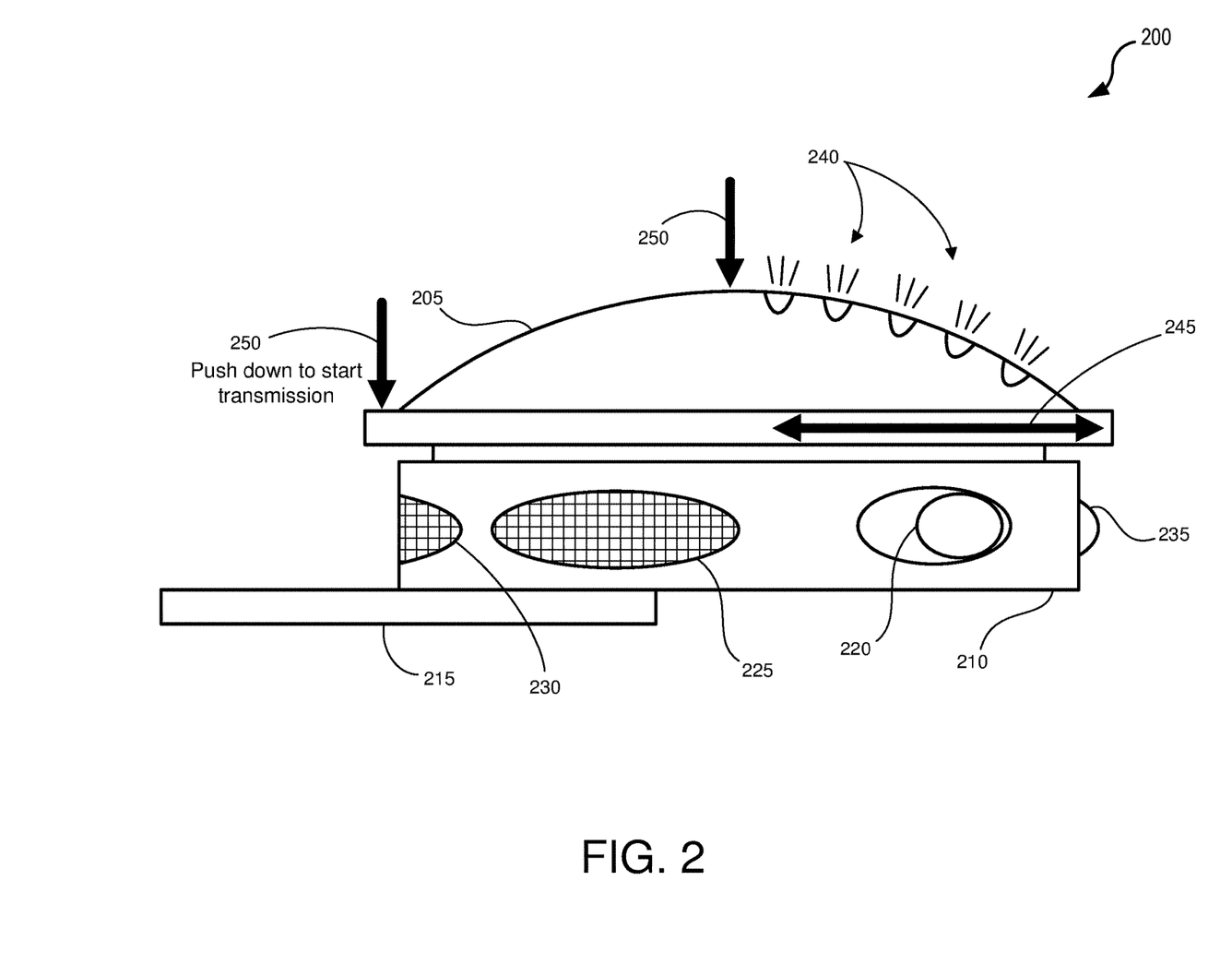
FIG. 2 illustrates an embodiment of a communication device that may be used in some embodiments of the present technology.

FIG. 2 illustrates an embodiment of a group communication device 200 that may be used in some embodiments of the present technology. In the embodiments illustrated in FIG. 2, group communication device 200 has a face 205 that can be generally circular in shape, as shown in FIG. 2A, or can be any other shape. Group communication device 200 can use the generally circular shape to facilitate certain operations and to permit the positioning of certain functions and components, which also can be performed and implemented in alternative ways in other configurations. Group communication device 200 a generally cylindrical body 210 and face 205 can be slightly convex (e.g., having a quasi-conical shape or a cup-like shape). Because of the simplified controls disclosed herein, group communication device 200 can be smaller and more compact that earlier personal communication devices. For example, some embodiments of group communication device 200 can have a diameter of between one and three inches and be between one-half to one inch thick, making wearing or otherwise attaching device 200 to a user easier, in addition to simplifying the device's operation.

Body 210 may have an attachment mechanism 215 (e.g., a clip or clasp) mounted thereon to permit attachment of device 200 to clothing, a backpack, a bag strap or another personal item that facilitates a user's conversation with other users while wearing device 200. Various functional components of device 200 can be situated around the periphery of body 210, as seen in FIG. 2. A master power switch 220 can turn device 200 master power on and off (as distinguished from silencing device 200 and/or enabling sound transmission by device 200). Speaker 225 and microphone 230 can be built into body 210. Speaker 225 and microphone 230 can be of a type and size that facilitates and enables conversation by a user wearing device 200. A volume control 235 can permit adjustment of the sound level generated by speaker 225 (e.g., lowering sound level by depressing one end—such as the "−" end—of volume control 235 and increasing sound level by depressing another end—such as the "+" end). Other components and/or features (e.g., a micro and/or other Universal Serial Bus (USB) port, charging port and/or headphone jack) can also be positioned around the periphery of device 200.

Face 205 can be made of plastic or any other suitable material and includes an optical display 240 which in FIG. 2 is an LED array. In other implementations, the optical display on face 205 can be a sticker, label or decal applied to face 205. LED array 240 can operate in various implementations such as, but not limited to, one-touch silencing and one-touch transmission. Face 205 can be attached to body 210 in a manner that permits limited rotation of face 205 relative to body 210, as referenced by arrow 245. Likewise, face 205 can be mounted to body 210 in a depressible configuration that permits limited displacement and depression of face 205 relative to body 210, as referenced by arrow 250.

When a user wishes to use device 200 for communicating (e.g., via an intermediate communication device 110A-110B or using cellular capabilities of device 200), face 205 can be rotated as indicated by arrow 245 relative to body 210 which puts device 200 in an active mode. Optical display 240 can be used to confirm successful switching to the active mode (e.g., by providing a single-color LED animation). Once the user knows that device 200 is in active mode, messages can be recorded and transmitted to associated group members, bots, IoT devices or other endpoints. To create a recording, a user may depress face 205 downward relative to body 210 as indicated by arrows 250. Sounds picked up by microphone 230 can be recorded locally on the device or streamed to an intermediary device (e.g., 110A-110B as shown in FIG. 1) while face 205 is depressed. Once face 205 is released, the recording stops. If the message is being stored locally on the group communication device 200, then the recorded message can then be transmitted to intermediary device for transmission or directly to remote management platform 170. The recorded message can then be transmitted to other endpoints (e.g., via remote management platform 170 shown in FIG. 1).

Figure 3:
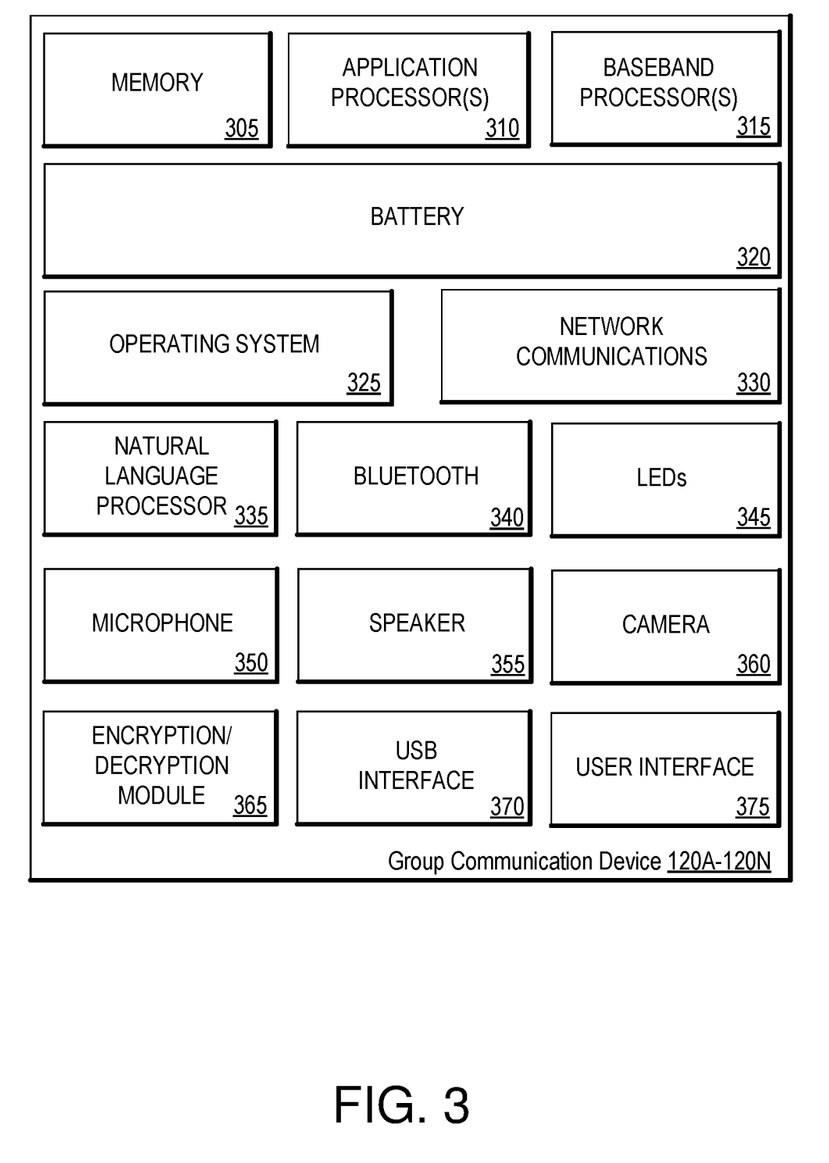
FIG. 3 illustrates an example of a set of components of a communication device in accordance with various embodiments of the present technology.

FIG. 3 illustrates a set of components within group communication device 120A-120N according to one or more embodiments of the present technology. As shown in FIG. 3, group communication device 120A-120N may include memory 305 (e.g., volatile memory and/or nonvolatile memory), application processor(s) 310, baseband processor(s) 315, power supply 320 (e.g., battery), operating system 325, network communications 330, natural language processors, 335, Bluetooth® interface 340, LEDs 345, microphone 350, speaker 355, camera 360, encryption/decryption module 365, USB interface 370, and or additional user interface. Other embodiments may include different component configurations that do not include some of the components, combine the functionality of various components into a single component, and/or do not include some of the components shown in FIG. 3. For example, various embodiments may include additional; transceivers, audio transducers, processing systems, environmental sensors, accelerometers, gyroscopes, Global Positioning System (GPS) receivers, and other hardware or software components.

Application processor 310 can provide the processing power to support software applications, memory management, graphics processing, and multimedia. Application processor 310 may be communicably coupled with memory 305 and configured to run the operating system, user interface 375, and the applications stored on memory 305. Baseband processor 315 may be configured to perform signal processing and implement/manage real-time radio transmission operations of group communication device 120A-120N. These processors along with the other components may be powered by power supply 320. The volatile and nonvolatile memories found in various embodiments may include storage media for storing information such as processor-readable instructions, data structures, program modules, or other data. Some examples of information that may be stored include basic input/output systems (BIOS), operating systems, and applications.

Group communication device 120A-120N may also include one or more network interfaces (e.g., Bluetooth Interface 340; and Network Communication Interface 330, which enables the group communication device to communicate with a remote management server or intermediary device by transmitting and receiving wireless signals using licensed, semi-licensed or unlicensed spectrum over a telecommunications network), natural language processors 335 for processing human speech, audio interface (not shown), microphone 350 for recording sounds, speaker 355 for playing messages, encryption/decryption module 365 for encrypting/decrypting messages, USB interface for powering the battery or transferring data, and/or other user interfaces 375 (e.g., displays, buttons, switches, keypad, and the like). The various components of a mobile device may be interconnected via a bus.

Figure 4:
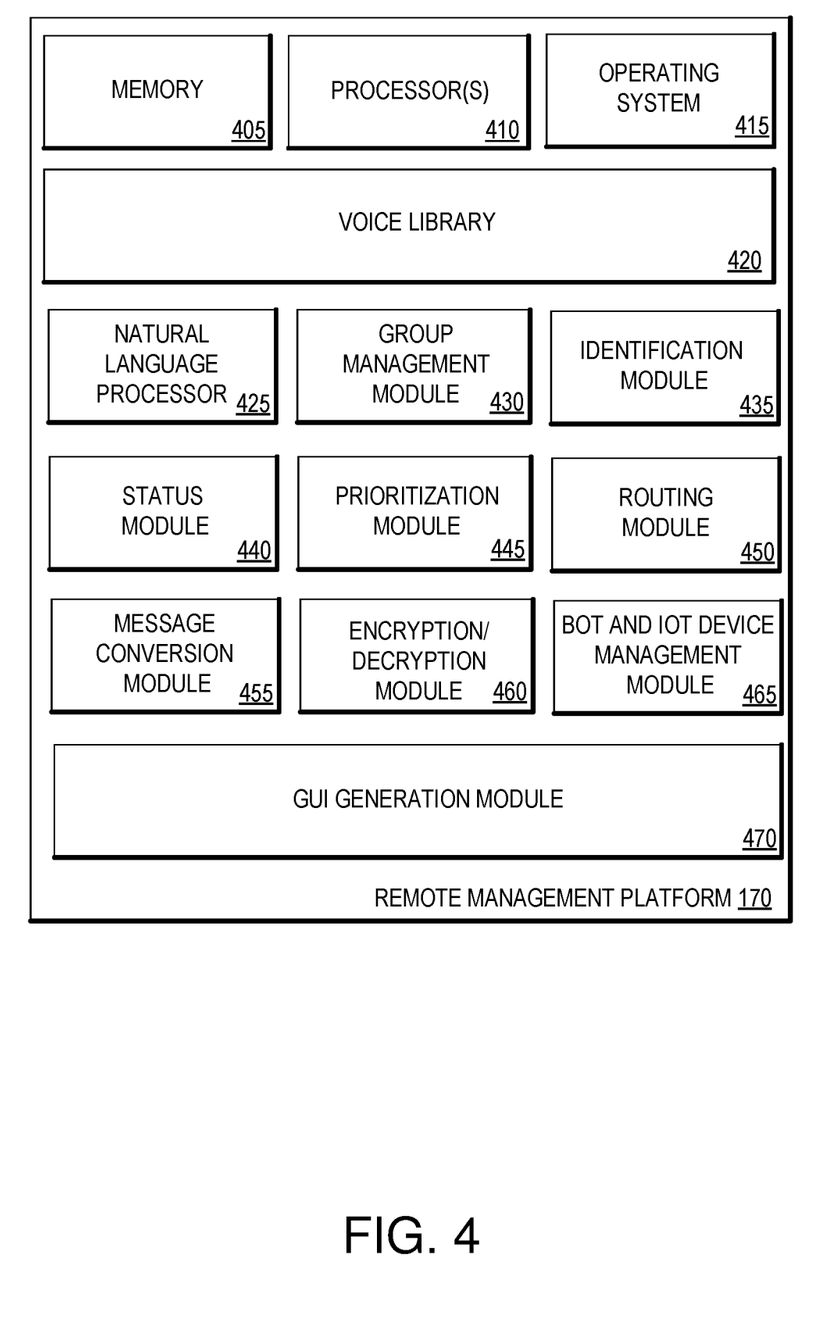
FIG. 4 illustrates an example of a set of components of a remote management system according to one or more embodiments of the present technology.

FIG. 4 illustrates a set of components within remote management platform 170 according to one or more embodiments of the present technology. According to the embodiments shown in FIG. 4, remote management platform 170 can include memory 405, one or more processors 410, operating system 415, voice library 420, natural language processor 425, group management module 430, identification module 435, status module 440, prioritization module 445, routing module 450, message conversion module 455, encryption/decryption module 460, bot and IoT device management module 465, and graphical user interface (GUI) generation module 470. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry.

Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, identification module 435 and status module 440 can be combined into a single module for monitoring a group communication device.

Memory 405 can be any device, mechanism, or populated data structure used for storing information. In accordance with some embodiments of the present technology, memory 405 can encompass any type of, but is not limited to, volatile memory, nonvolatile memory and dynamic memory. For example, memory 405 can be random access memory, memory storage devices, optical memory devices, media magnetic media, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 405.

Memory 405 may be used to store instructions for running one or more applications or modules on processor(s) 410. For example, memory 405 could be used in one or more embodiments to house all or some of the instructions needed to execute the functionality of operating system 415, voice library 420, natural language processor 425, group management module 430, identification module 435, status module 440, prioritization module 445, routing module 450, message conversion module 455, encryption/decryption module 460, bot and IoT device management module 465, and/or GUI generation module 470. Operating system 415 provides a software package that is capable of managing the hardware resources of management platform 140. Operating system 415 can also provide common services for software applications running on processor(s) 410.

Voice library 420 can include a set of voice commands that can be used to by remote management platform 170 for processing recorded messages received from group communication devices. For example, a recorded message may include explicit directives such as "order a pizza" or "delete Sam from the group." This library can be used to help identify and process those explicit directives or commands within the directive. Voice library 420 may also include customized training data received from users so that their voice commands may be processed more accurately.

Natural language processor 425 can use voice library 420 to analyze and parse the recorded messages that are received from the group communication devices. Natural language processor 425 can process the natural language used by the users of the communication device to determine if there are any directives that may be included within the message or if the message is a personal message for just the other group members. Message conversion module 455 can receive the directives identified by natural language processor 425 and generates a modified message based, at least in part, on the directive identified by the natural language processor and the protocols and formatting requirements of the destination endpoint (e.g., IoT device or bot). The modified message can then be routed based on commands from routing module 450. In addition, routing module 450 may route (e.g., based on a group ID and routing table entry) responses or messages from any endpoint to the group.

Group management module 430 can be configured to receive a request to create or modify a group. This request may originate from a device at the factory when the communication devices are built, upon activation, from a store, from a user, or the like. The request may identify whether a default group is being created, a new group is being created, and/or with an existing group is being modified. Group management module 430 can update or create entries in a routing table to create new groups or modify existing groups to include an additional communication device or to remove at least one of the communication devices from the group.

Identification module 435 can identify the group or destination endpoint for any message received. For example, a response from a bot can be processed by identification module 435 to determine the group and/or other endpoints. Identification module 435 can use information in the message itself (e.g., by using a field in the message) to identify a message chain, originating device, group, etc. Using this information, identification module 435 can looking up destination IP addresses or other routing information for routing the message.

Status module 440 can monitor for update messages from the various endpoints and can update contact information, device information, communication signal strength and other data within routing table entries. This information can be used to decide how to process the recorded messages. In some embodiments, prioritization module 445 can assign priorities to messages that are sent using routing module 450. In one or more embodiments, these messages may be encrypted. Encryption/decryption module 460 can be used to encrypt and decrypt any of the messages sent or received at the remote management platform.

Bot and IoT device management module 465 can be used to manage the bots and IoT devices. For example, various bots and IoT devices may have particular communication protocols and/or other interfacing requirements. Bot and IoT device management module 465 can identify these requirements and ensure that message conversion module 455 converts messages into the correct format.

GUI generation module 470 can generate one or more GUI screens that allow for interaction with a user. In at least one embodiment, GUI generation module 470 can generate a graphical user interface allowing a user to set group preferences, review reports, add/remote IoT devices and/or bots, and/or otherwise receive or convey information about groups and the group communication devices to the user.

Figure 5:
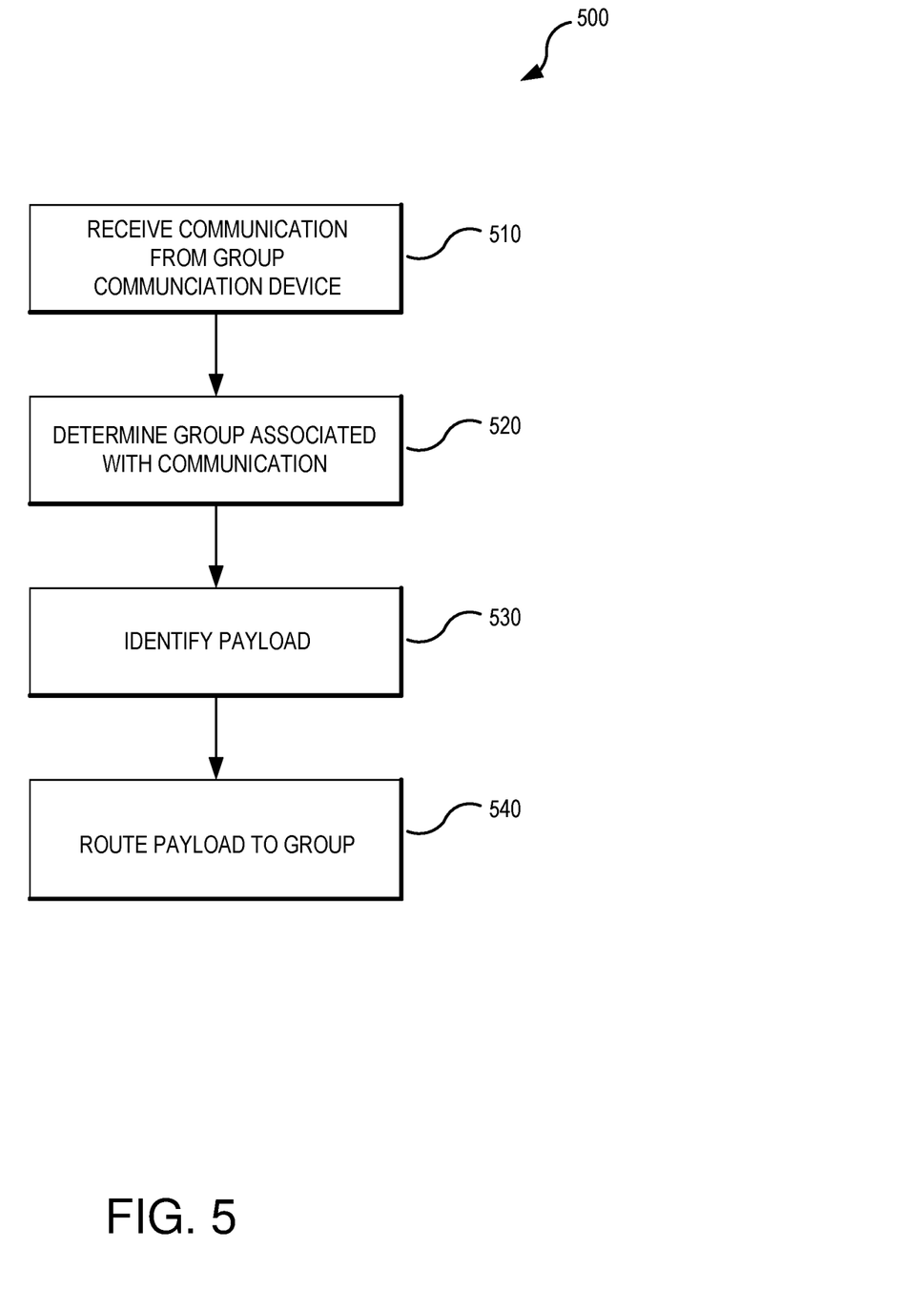
FIG. 5 illustrates an example of a set of operations for routing messages within a communications environment according to some embodiments of the present technology.

FIG. 5 illustrates an example of a set of operations 500 for routing messages within a communications environment according to some embodiments of the present technology. The operations illustrated in FIG. 5 can be performed by remote management platform 170 and/or one or more components (e.g., processor(s) 410), engines, and/or modules (e.g., identification module 435) associated with remote management platform 170. As illustrated in FIG. 5, a communication is received from a group communication device during receiving operation 510. The communication received during receiving operation 510 may include multiple fields. For example, in some embodiments, the communication may include one or more of a originating device identifier, a user identifier, a group selection identifier, a time/date stamp, IP address, payload, and/or other field.

Using the contents of the communication message, determination operation 520 can determine members of a group to which a message contained within the communication should be transmitted. Identification operation 530 can identify the recorded message. The recorded message can be processed, if needed, and then relayed to the group members using routing operation 540.

Figure 6:
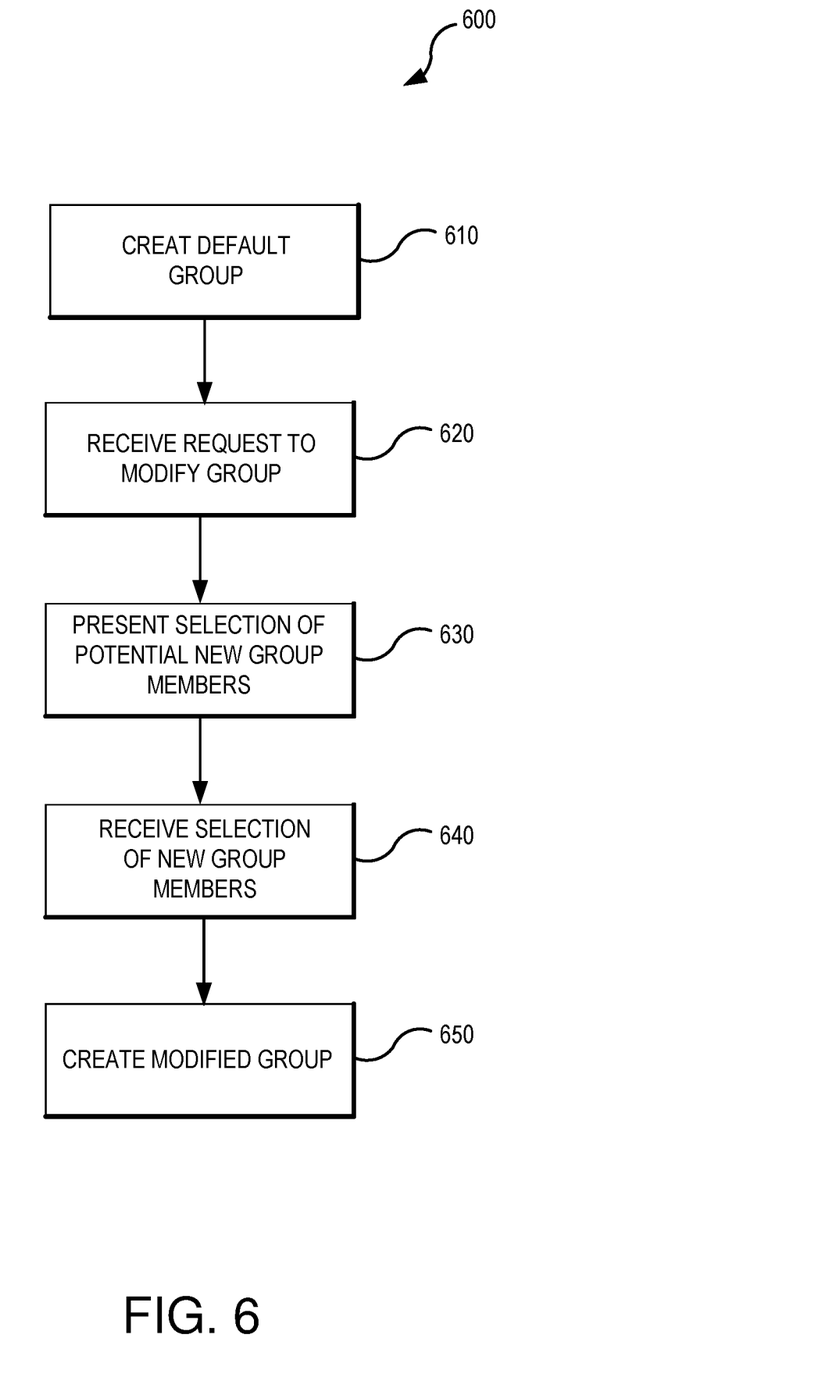
FIG. 6 illustrates an example of a set of operations for modifying a group of communication devices, bots, IoT devices, or other endpoints in accordance with various embodiments of the present technology.

FIG. 6 illustrates an example of a set of operations 600 for modifying a group of communication devices, bots, IoT devices, or other endpoints in accordance with various embodiments of the present technology. As illustrated in FIG. 6, creation operation 610 creates a default group for communications between one or more endpoints. The default group may be set at a factory or upon activation. For example, the default group may be created between a multiple group communication devices 120A-120N at the factory and those devices can be packaged and sold together to the consumer. An entry in a routing table may be created at that time. In other embodiments, the entry may be created upon activation. For example, the devices may share a common code or identifier that is automatically identified and sent to the remote management platform 170 to allow for creation of the entry. As another example, the devices may automatically pair with nearby devices upon activation. The devices can then send, for example, a single registration request to create the entry in the routing table. The devices may include various branding (e.g., sports, food, entertainment, or other type branding) which is based on the automatic inclusion of various bots or voice assistants in the default group that specialize in that knowledge.

Over time, a user may desire to modify the group. In response to a request to modify the group that is received during receiving operation 620, a selection of potential new group members can be presented during presentation operation 630. A selection can be entered during selection operation 640 and the modified group can be created during creation operation 650.

Figure 7:
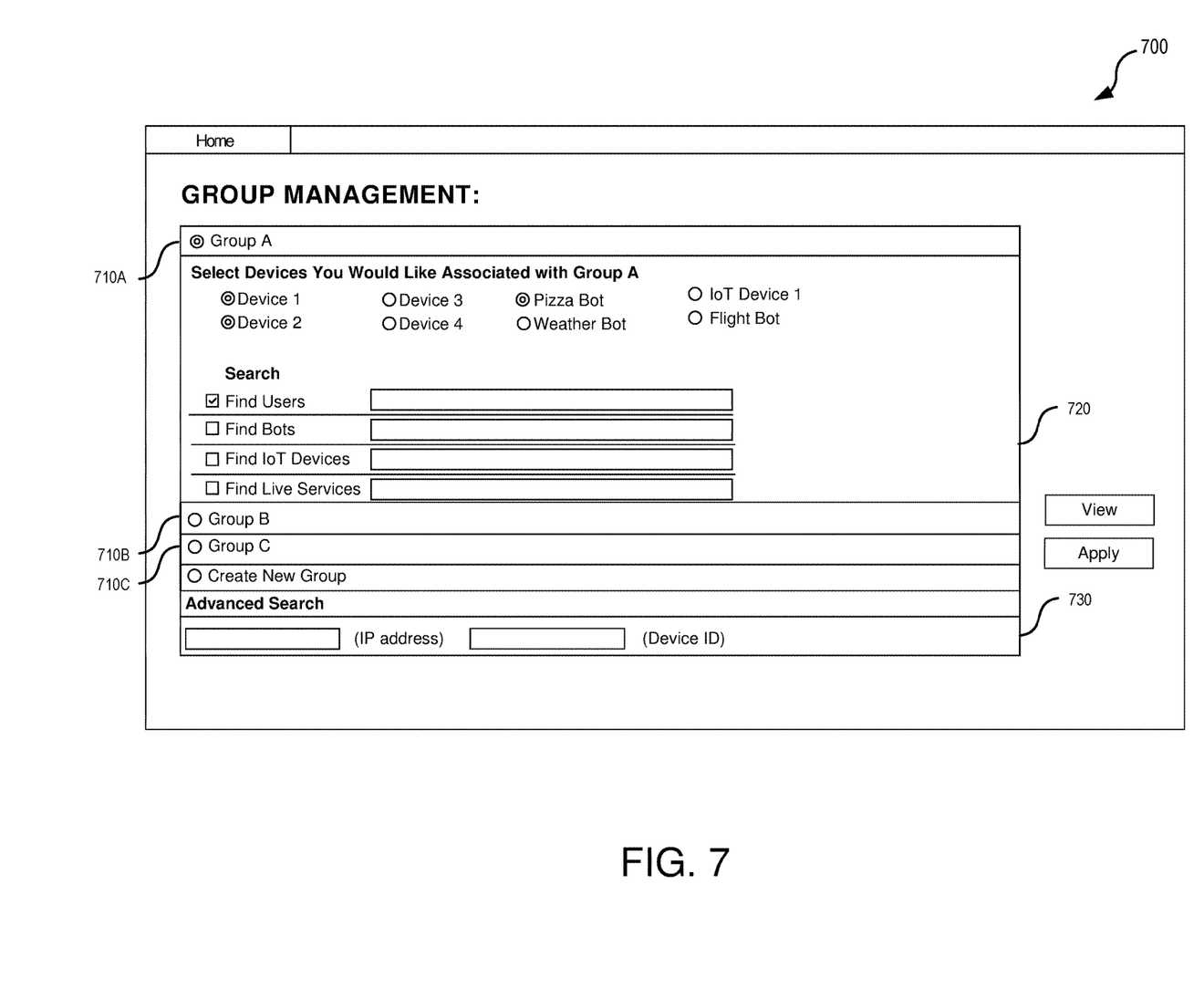
FIG. 7 illustrates an example of a graphical user interface that may be used for modifying a group of communication devices, bots, IoT devices, or other endpoints in accordance with one or more embodiments of the present technology.

FIG. 7 illustrates an example of a graphical user interface 700 that may be used for modifying a group of communication devices, bots, IoT devices, or other endpoints in accordance with one or more embodiments of the present technology. As illustrated in FIG. 7, a user can select a group 710A-710C for management. Once a group is selected, the user can use device selection area 720 or advance search area 730 for identifying addition endpoints such as bots, IoT devices, live assistants, group communication devices and the like.

Figure 8:
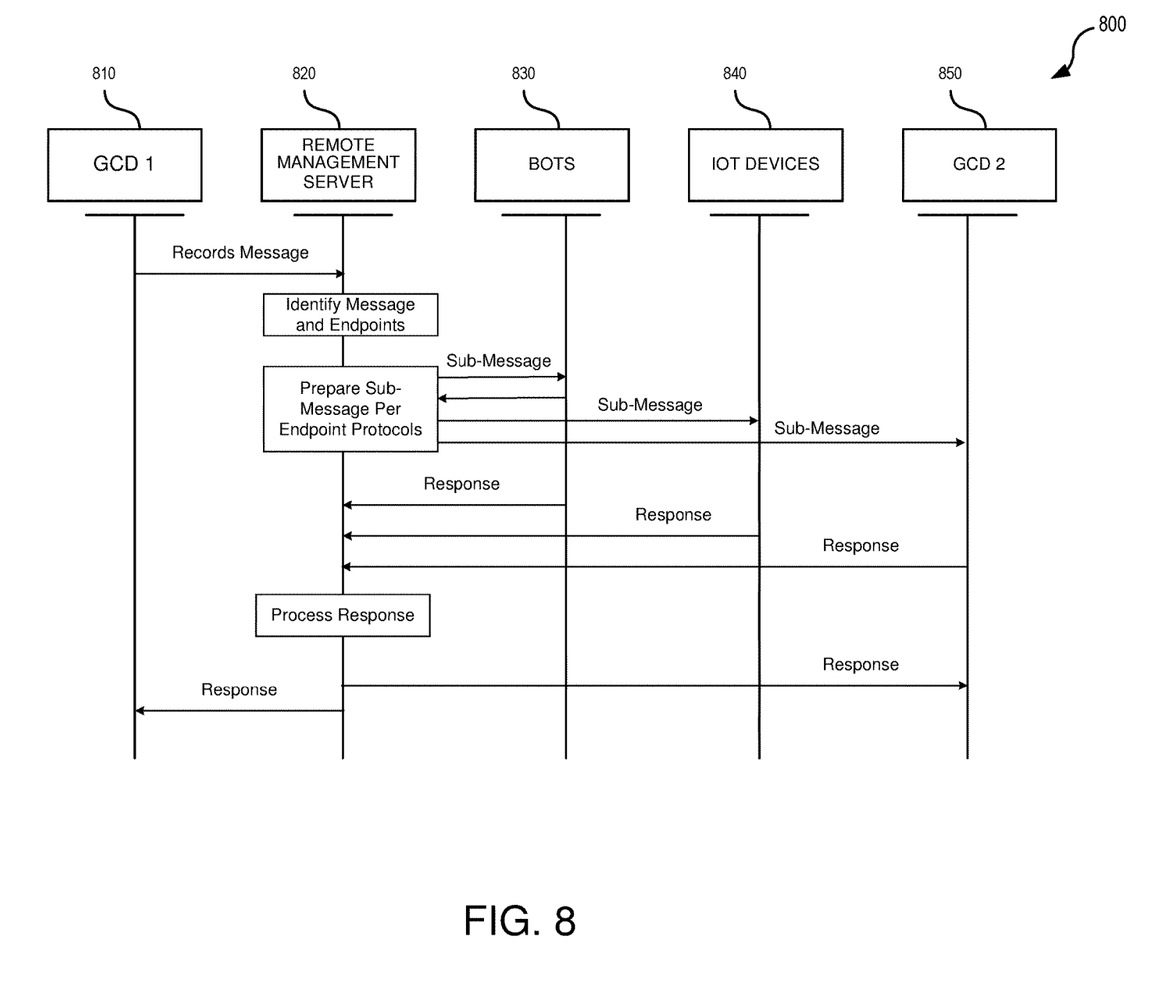
FIG. 8 is a sequence diagram illustrating an example of a set of communications between components of a communication system in accordance with some embodiments of the present technology.

FIG. 8 is a sequence diagram 800 illustrating an example of a set of communications between components of a communication system in accordance with some embodiments of the present technology. As illustrated in the embodiments shown in FIG. 8, a first group communication device 810 can record a message (e.g., audio message or a video message) which can be transmitted to remote management server 820. The remote management server can identify the message, the originating device, and destination endpoints. In some cases, the message may need to be processed. For example, the message may include various directives (e.g., implicit, explicit, group, etc.). Remote management platform 820 can prepare sub-messages per endpoint protocols before transmission to bots 830, IoT devices 840, and/or additional group communication devices. Any responses from these endpoints are routed back through remote management server 820 and can be processed before being delivered to the group communication devices.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
creating, at a remote management platform, an entry for a first wireless communication device in a routing table stored to a database, the entry identifying a default grouping of communication devices including the first wireless communication device and a set of additional communication devices, the default grouping established for the communication devices in the default grouping at manufacturing of the communication devices;
adding a bot, with a processing system capable of processing natural language commands and generating a response, to the set of additional communication devices of the default grouping;
receiving, at the remote management platform, a recorded audio message from the first wireless communication device;
identifying, at the remote management platform, the set of additional communication devices associated with the default grouping based on the entries in the routing table for the set of additional communication devices; and
transmitting, from the remote management platform, the recorded audio message to the set of additional communication devices.

2. The method of claim 1, further comprising:
receiving a request to create a customized grouping by adding an additional communication device to the default grouping; and
creating an entry in the routing table so any recorded audio message received after the entry is added will be routed to the default grouping and the additional communication device.

3. The method of claim 2, wherein the request to create the customized grouping occurs from a voice command recorded from the first communication device or a communication device in the set of additional communication devices.

4. The method of claim 1, further comprising:
automatically creating the entry upon initialization of a communication device from the default grouping;
generating a linking request, at the communication device being initialized, that is automatically sent to the remote management platform; and
creating the default grouping by generating entries for each of the respective communication devices in the routing table at the remote management platform.

5. The method of claim 4, further comprising
identifying communication devices that are present upon initialization and within a distance of a short-range signal generated by one of the communication devices and wherein the linking request includes a device ID of each of the communication devices that were present upon initialization.

6. The method of claim 5, wherein at least one of the set of additional communication devices include a cellular communications component capable of connecting directly with a cellular network.

7. A remote management platform comprising:
a processor;
a database having stored thereon a routing table including a plurality of device entries, wherein each entry identifies a specific communication device and a group of communication devices associated with that specific communication device; and
a computer readable storage medium having instructions stored thereon that, when executed by the processor, cause the remote management platform to:
receive a grouping request generated upon an initial activation of a wireless communication device;
create an entry in the routing table based, at least in part, on information within the grouping request;
associate the wireless communication device with a default group of communication devices according to the entry within the routing table, so that recorded audio messages received from any one of the default group of communication devices are automatically routed to the remaining communication devices in the default group, wherein the default group for a communication device is set upon initial activation of the communication device;

receive a modification request from a selected communication device in the default group to add or remove another communication device from the default group; and based on the modification request, update the routing table to at least one of:
add an additional communication device, including a bot with a processing system capable of processing natural language commands and generating a response, to the default group; and
remove at least one of the communication devices from the default group.

8. The remote management platform of claim 7, wherein the instructions stored on the computer readable storage medium when executed by the processor, further cause the remote management platform to:
analyze the recorded audio messages for natural language;
identify at least one of: an implicit directive and an explicit directive;
generate a modified message based, at least in part, on the directive identified; and
route the modified message to a destination.

9. The remote management platform of claim 8, wherein the identified directive is an implicit directive and wherein the instructions stored on the computer readable storage medium when executed by the processor, further cause the remote management platform to:
send the modified message to the bot, wherein the modified message is also generated to comply with a communication protocol of the bot.

10. The remote management platform of claim 9, wherein the instructions stored on the computer readable storage medium when executed by the processor, further cause the remote management platform to:
receive responses from the bot;
identify a target group of communication devices for routing; and
route responses from the bot to the target group of communication devices identified.

11. The remote management platform of claim 8, wherein the directive is an explicit directive identifying the bot and the destination is the bot.

12. A method comprising:
generating, at a wireless communication device, a registration request upon initial activation of the communication device:
transmitting an activation signal from the wireless communication device to a cloud-based remote management platform running on one or more servers;
creating an entry in a routing table at the cloud-based remote management platform, the entry associating the wireless communication device with a default group of additional communication devices, wherein each communication device associated with the default group includes a unique identifier, and the default group includes communication devices that each share at least a common portion of their respective unique identifiers;
adding a bot, with a processing system capable of processing natural language commands and generating a response, to the additional communication devices of the default group;
recording an audio message at the wireless communications device;
transmitting the audio message from the wireless communication device, upon completion of the recording, to the cloud-based management platform;
identifying, at the cloud-based management platform, the default group of additional communication devices by the respective entries in the routing table; and
transmitting the recorded audio message to each of the additional communication devices.

13. The method of claim 12, wherein the entry in the routing table includes the unique identifier of the wireless communication device and a group identifier for the default group.

14. The method of claim 12, wherein the default group can be modified to include one or more additional bots, voice assistants, or internet of things (IoT) devices.

15. The method of claim 12, wherein the wireless communication device includes a cellular communication component capable of connecting directly with a cellular communication network without an intermediate device.

16. The method of claim 12, further comprising:
monitoring the recorded audio messages;
identifying at least one of: an implicit directive and an explicit directive;
generating a modified message based, at least in part, on the directive identified; and
routing the modified message to a destination.

17. The method of claim 1 further comprising:
identifying communication devices in the default grouping based on at least a common portion of a device identifier for each of the respective communication devices in the default grouping, wherein the device identifier for each communication device is included in respective entries in the routing table.

18. The remote management platform of claim 7, wherein the modification request includes a voice command.

19. The method of claim 12, wherein the default group is established for the associated communication devices at manufacturing.

* * * * *